United States Patent
Garofalo

(10) Patent No.: US 8,322,151 B1
(45) Date of Patent: Dec. 4, 2012

(54) SYSTEMS AND METHODS FOR GATHERING DATA FROM AND DIAGNOSING THE STATUS OF AN AIR CONDITIONER

(75) Inventor: Alejandro E. Garofalo, San Jacinto, CA (US)

(73) Assignee: Demand Side Environmental, LLC, Hayward, CA (US)

( * ) Notice: Subject to any disclaimer, the term of this patent is extended or adjusted under 35 U.S.C. 154(b) by 157 days.

(21) Appl. No.: 12/205,310

(22) Filed: Sep. 5, 2008

Related U.S. Application Data

(63) Continuation of application No. 12/190,751, filed on Aug. 13, 2008, now abandoned.

(51) Int. Cl.
F25B 49/00 (2006.01)
G01K 13/00 (2006.01)
G01M 1/38 (2006.01)
G05D 23/00 (2006.01)

(52) U.S. Cl. .............. 62/127; 62/129; 62/149; 700/276; 700/300

(58) Field of Classification Search .................... 62/127, 62/129, 125, 149; 236/51; 700/276, 204, 700/300, 90
See application file for complete search history.

(56) References Cited

U.S. PATENT DOCUMENTS

| | | | |
|---|---|---|---|
| 5,955,682 A | 9/1999 | Faircloth | |
| 6,128,910 A | 10/2000 | Faircloth | |
| 6,385,510 B1* | 5/2002 | Hoog et al. | 700/276 |
| 7,201,006 B2 | 4/2007 | Kates | |
| 7,244,294 B2 | 7/2007 | Kates | |
| 7,275,377 B2 | 10/2007 | Kates | |
| 2004/0088082 A1* | 5/2004 | Ahmed | 700/276 |
| 2004/0111186 A1* | 6/2004 | Rossi et al. | 700/276 |
| 2004/0261431 A1 | 12/2004 | Singh et al. | |
| 2006/0032247 A1* | 2/2006 | Kates | 62/129 |
| 2006/0185373 A1 | 8/2006 | Butler et al. | |
| 2007/0012052 A1 | 1/2007 | Butler et al. | |
| 2007/0209426 A1 | 9/2007 | Locke et al. | |
| 2007/0271014 A1 | 11/2007 | Breed | |
| 2008/0016366 A1 | 1/2008 | Monroe | |
| 2008/0077260 A1* | 3/2008 | Porter et al. | 700/90 |

OTHER PUBLICATIONS

Enalysas Corporation website from Wayback Machine Archive, Jul. 21, 2001 edition, Author Unknown, 24 pgs. [online] [retreived on Feb. 10, 2009]. Retrieved from the Internet: http://web.archive.org/web/20010804003137/www.enalasys.com/index.html.

* cited by examiner

*Primary Examiner* — Chen Wen Jiang
(74) *Attorney, Agent, or Firm* — Workman Nydegger

(57) ABSTRACT

Systems and methods for gathering data from and diagnosing the status of an air conditioner comprising three wireless transmitters, two pressure sensors, five temperature sensors, a humidity sensor, a wireless receiver, and a computing device, the sensors operable to sense parameters of the air conditioning system, the wireless transmitters operable to transmit data representing the sensed parameters of the air conditioning system to the receiver, the receiver operable to receive the data and send the data to the computing device, the computing device operable to analyze the data to determine a status of the air conditioning system.

28 Claims, 8 Drawing Sheets

SYSTEMS AND METHODS FOR GATHERING DATA FROM AND DIAGNOSING THE STATUS OF AN AIR CONDITIONER

CROSS-REFERENCE TO RELATED APPLICATIONS

This patent application is a continuation of U.S. patent application Ser. No. 12/190,751 filed on Aug. 13, 2008, entitled "SYSTEMS AND METHODS FOR GATHERING DATA FROM AND DIAGNOSING THE STATUS OF AN AIR CONDITIONER," which is incorporated herein in its entirety by reference.

BACKGROUND OF THE INVENTION

1. The Field of the Invention

The present invention relates generally to gathering and analyzing measurements from an air conditioning system. In particular, the invention relates to systems and methods for diagnosing a status of an air conditioner using sensors, transmitters, receivers, and a computing device.

2. The Relevant Technology

The concept of air conditioning dates back at least to the first millennium B.C., when the ancient Romans cooled houses by circulating water through their walls. Modern air conditioning technology, which controls not only air temperature but also air humidity, emerged during the first decade of the 1900's. Throughout the first half of the 20th century, this technology was used primarily to improve productivity and control processes in industrial settings, such as printing plants and textile factories.

Residential use of air conditioners increased significantly in the 1950's. As the cost of air conditioning technology decreased, residential air conditioners spurred growth and development in cities with hot, dry climates, such as Phoenix, Ariz. and Las Vegas, Nev. Air conditioning also played an important role in improving the living conditions in the southeastern United States, where high temperatures and high humidity are common during the summer months.

A modern air conditioning system uses ducts and a fan to circulate air throughout a building while leveraging the evaporation cycle of a refrigerant to lower the temperature and humidity of the air as it passes through the ducts. The ducts include return ducts and supply ducts. The return ducts take in warm air from the living space and circulate the warm air across an evaporating coil. As the warm air passes over the evaporating coil, the refrigerant circulating through the evaporator absorbs heat and moisture from the air, lowering the air's temperature and humidity. The supply ducts then circulate the cool air back to the living space.

The condensing unit controls the evaporation cycle of the refrigerant. Located outside the building, the condensing unit includes a compressor, condensing coils, and an expansion device. Together, the condensing unit and the evaporating coil constitute a closed system through which the refrigerant circulates. The refrigerant leaves the evaporator and enters the compressor as a cool gas. The compressor compresses the gas, transforming it into a hot gas. Heat dissipates as the hot gas leaves the compressor and passes through the condensing coils, causing the hot gas to condense into a cool liquid. As the cool liquid passes through the expansion device, the expansion device reduces the pressure on the refrigerant, transforming it into a cold gas or liquid. The cold gas or liquid then flows through the evaporator, where it can absorb heat and moisture from the air circulating through the ducts.

Air conditioning systems may malfunction or perform poorly for a variety of reasons. Dirty filters can reduce the air flow through the ducts, forcing the air conditioner to run longer to condition a given volume of air. Dirty coils can reduce the rate of transfer of heat between the refrigerant and the air. Leaky or poorly insulated ducts can transfer heat from an attic into the circulating air or vent cool air into a crawlspace. Using too much refrigerant ("overcharging"), which is typically the result of improper maintenance, reduces the efficiency of the air conditioning system and may damage the condenser. Likewise, using too little refrigerant ("undercharging"), which is typically the result of a leak or improper maintenance, reduces the efficiency of the air conditioning system.

Overcharging or undercharging of the refrigerant is a serious problem requiring significant expertise to diagnose and correct. Simple viewing windows that permit a person to observe the level of refrigerant in some component of the air conditioning system are unreliable because the amount of refrigerant in a given component of the system varies when the system is operating, and the refrigerant tends to collect in the coolest component of the system when the system is not operating. Diagnostic methods that rely on draining or venting the refrigerant are discouraged because refrigerants used in air conditioners are often environmentally unsafe. Therefore, diagnostic methods that rely on electronic sensors to indirectly measure refrigerant levels are safer and more reliable than manual methods.

However, typical sensor-based systems that indirectly measure refrigerant levels leave much room for improvement. In particular, typical systems tend to gather inaccurate data, and, as a consequence, these systems often mischaracterize the status of the refrigerant. Typical systems gather inaccurate data for several reasons.

Typical data-gathering systems measure, among other quantities, the temperature of the air in the supply and in the return, as well as the humidity of the air in the return. Parameters of the air in the supply and in the return can be sampled at many locations, because the supply and the return are both large volumes of air. However, parameters of the supply are more accurately measured as the distance between the sampling location and the evaporator decreases. Typical data-gathering systems often acquire inaccurate measurements because they are unable to sample parameters of the supply at a location sufficiently near the evaporator.

A typical data-gathering system uses a single transmitter deployed in the interior of the building to measure the air temperatures at the return and the supply. This single transmitter may be equipped with two temperature sensors attached via cables, but it is often difficult or impossible to position those two sensors such that they simultaneously and accurately measure the temperatures of the air in the return and the air in the supply, because the distance between two positions where accurate measurements can be obtained is often quite large.

Furthermore, a typical data-gathering system uses temperature sensors that are too large to fit between the slats of a vent. Consequently, the typical system samples the air temperatures in front of the return and supply vents, rather than behind the vents. For these reasons, typical data-gathering systems are often unable to accurately measure the air temperature in the return and in the supply nearest the evaporator.

Improper calibration of sensors is another common source of inaccurate data in typical data-gathering systems. In a typical data-gathering system, the manufacturer calibrates the sensors and distributes calibration files that are stored external to and remote from the sensor/transmitter units. With this calibration scheme, sensors are often calibrated incorrectly. Incorrect calibration of sensors can yield wildly inaccurate sensor readings. Thus, miscalibrated sensors are another source of inaccurate data in typical data-gathering systems.

To compensate for inaccurate measurements, typical data-gathering systems average multiple readings of the same sensor to obtain an estimate of the sensed value for a given sampling period. Averaging reduces but does not eliminate the impact of inaccurate, outlying measurements, such as those measurements that might be obtained by miscalibrated sensors.

The accuracy of the refrigerant status determined by the sensor-based system depends greatly on the accuracy of the data gathered by the sensors. When the gathered data is inaccurate, the status determined by the system tends to be inaccurate. In the worst case, when the gathered data includes many inaccurate, outlying measurements, the status determined by the system tends to oscillate between "overcharged" and "undercharged". This instability makes it difficult for a service technician to properly charge the refrigerant or to determine when the refrigerant is properly charged.

Typical data-gathering systems also suffer from power supply problems. These systems tend to use transmitters with non-standard batteries that cannot be purchased at local stores. If rechargeable, these batteries typically must be removed from the transmitters for recharging. Also, the transmitters tend to waste considerable energy between successive data transmissions. Taken together, these factors create conditions under which the transmitters' energy sources are easily depleted and not easily replenished.

Typical data-gathering systems use an RS-232 protocol for communication between the receiver and the computer. However, RS-232 ports are uncommon on modern computers.

Typical data-gathering systems also use long external antennae that attach to the exteriors of the transmitters. However, these exterior antennae are easily lost or broken, rendering the transmitters inoperable.

BRIEF SUMMARY OF THE INVENTION

The present invention includes methods and systems for diagnosing the status of an air conditioning system. In one embodiment, the status of an air conditioning system is diagnosed by measuring parameters of the air conditioner's condensing unit, return, and supply via a system of sensors attached to respective transmitters. The transmitters transmit data representative of the measurements to a receiver, which sends the data to a computing device. The computing device uses the data to determine the status of the air conditioner and reports the status for review by a user.

In one embodiment, the invention includes three transmitters. Each transmitter includes at least one sensor, an internal antenna, a data collector, and a power source. The power source provides power to the sensors, the internal antenna, and the data collector. The first transmitter is configured to be placed adjacent to the condensing unit and includes multiple pressure and temperature sensors. The second transmitter is configured to be placed adjacent to the return and includes a temperature sensor and a humidity sensor. The third transmitter is configured to be placed adjacent to the supply and includes a temperature sensor. The sensors obtain measurements of various pressures, temperatures, and air humidity, and the data collectors convert these measurements into data representative of the measurements. The transmitters transmit the data to the receiver wirelessly via the internal antennae, and the receiver sends the data to the computing device, which analyzes the data to determine the status of the air conditioner, for example, the level of refrigerant in the air conditioner.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention includes methods and systems for diagnosing the status of an air conditioning system. In one embodiment, the status of an air conditioning system is diagnosed by measuring parameters of the air conditioner's condensing unit, return air duct system ("return"), and supply air duct system ("supply") via sensors attached to transmitters. The transmitters transmit data representative of the measurements to a receiver, which sends the data to a computing device, such as a laptop computer, located in or adjacent to the building housing the air conditioning system. The computing device uses the data to determine a status of the air conditioner and reports the status, e.g. by displaying the status on display device such as a monitor, printing the status, electronically mailing the status, audibly reciting the status, etc.

Figure 1:
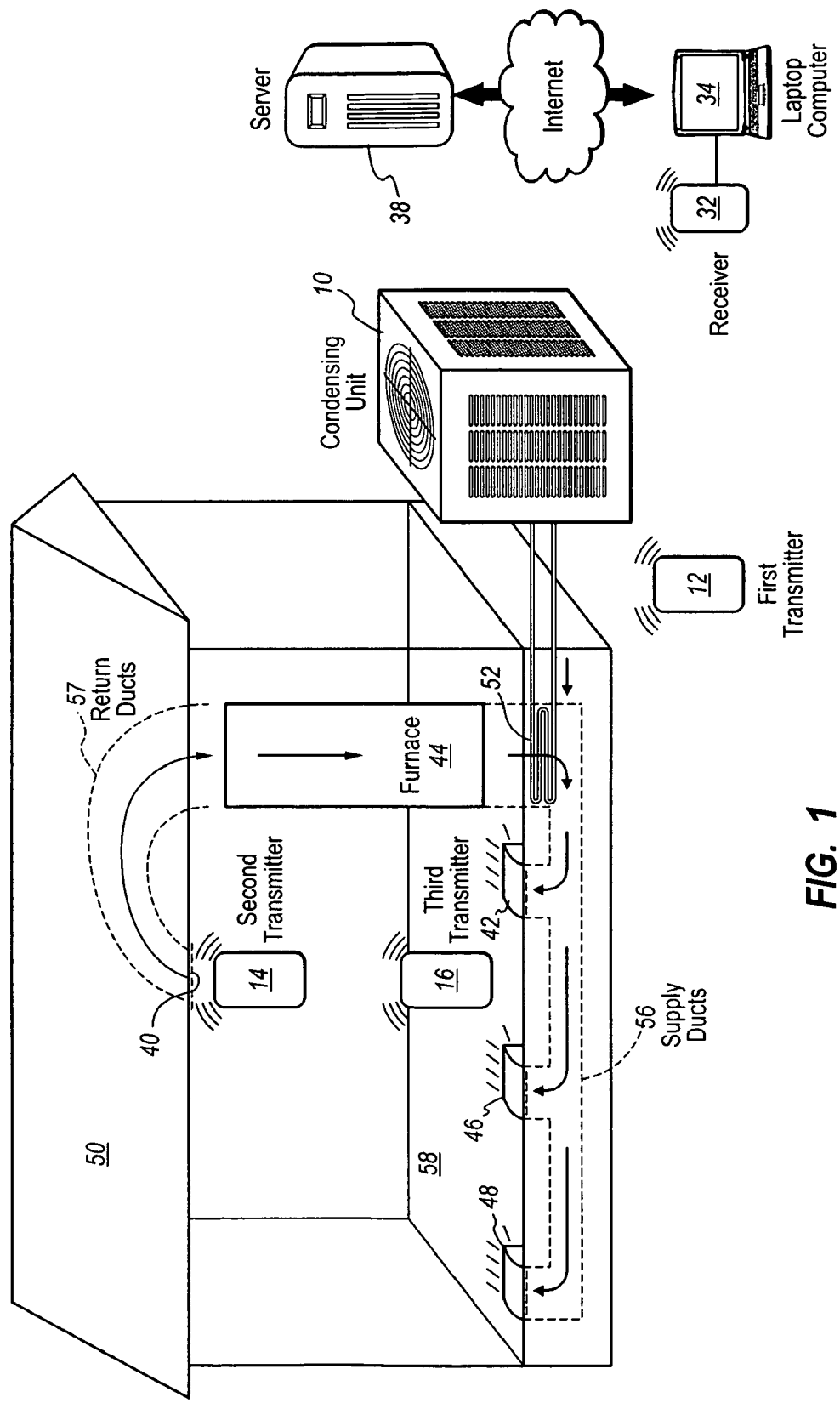
FIG. 1 depicts a schematic representation of a system for gathering data from an air conditioner and for reporting the status of the air conditioner.

One embodiment of present invention will now be described with reference to the appended figures. Referring now to FIG. 1, FIG. 1 depicts one embodiment of a system for gathering data from an air conditioning system and reporting the status of the air conditioner. For example, in one embodiment, the air conditioning system is a central air conditioning system and the tonnage is between 1.5 and 6.0 tons. The air conditioning system operates to lower the temperature and the humidity of the air in the living space 58 of the building 50.

Inside building 50, the air conditioning system comprises supply ducts 56 that deliver conditioned air to living space 58 via the supply vents 42, 46, and 48, return ducts 57 that receive air through the return vent 40 and return that air to the furnace 44, and an evaporator 52 that cools the air as it passes from furnace 44 into supply ducts 56. Outside building 50, the air conditioning system further comprises a condensing unit 10 with a number of condensing coils 54. Those skilled in the art will recognize that the air conditioning system depicted in FIG. 1 represents just one of many possible configurations of an air conditioning system in a home, business, or other building, and is intended to illustrate one possible embodiment.

A data-gathering system gathers data from the air conditioning system and analyzes that data to determine, for example, whether the air conditioning system's refrigerant is undercharged, properly charged, or overcharged. After diagnosing a status of the air conditioning system, a user (such as a technician) can, if necessary, adjust or repair the air conditioning system to correct any diagnosed malfunction or problem. The data-gathering system comprises three transmitters 12, 14, and 16, a receiver 32, and a computing device 34 (e.g. a mobile computing device) in communication with a server 38 via the Internet as reflected in FIGS. 1, 2, and 7.

First transmitter 12 is positioned adjacent to condensing unit 10 such that pressure and temperature sensors of first transmitter 12 collect measurements regarding condensing unit 10. First transmitter 12 may then transmit data representative of the collected measurements to receiver 32. Second transmitter 14 is positioned near return vent 40 and collects measurements regarding the temperature and humidity of the air in the return ducts 57 with temperature and humidity sensors. Second transmitter 14 may then transmit data representative of the collected measurements to receiver 32. Third transmitter 16 is positioned near supply vent 42. The evaporator 52 may be nearer to supply vent 42 than to any other supply vent; the supply vent having this distinction is sometimes referred to as the "nearest supply vent" or the "supply vent nearest the evaporator". Using temperature sensors, third transmitter 16 collects measurements regarding the air in the supply ducts 56, after which third transmitter 16 may transmit data representative of the collected measurements to receiver 32.

By deploying two distinct transmitters in the interior of the building, the present invention is able to obtain accurate measurements of the temperatures of the air in the return and in the supply, as well as the humidity of the air in the return.

Figure 2:
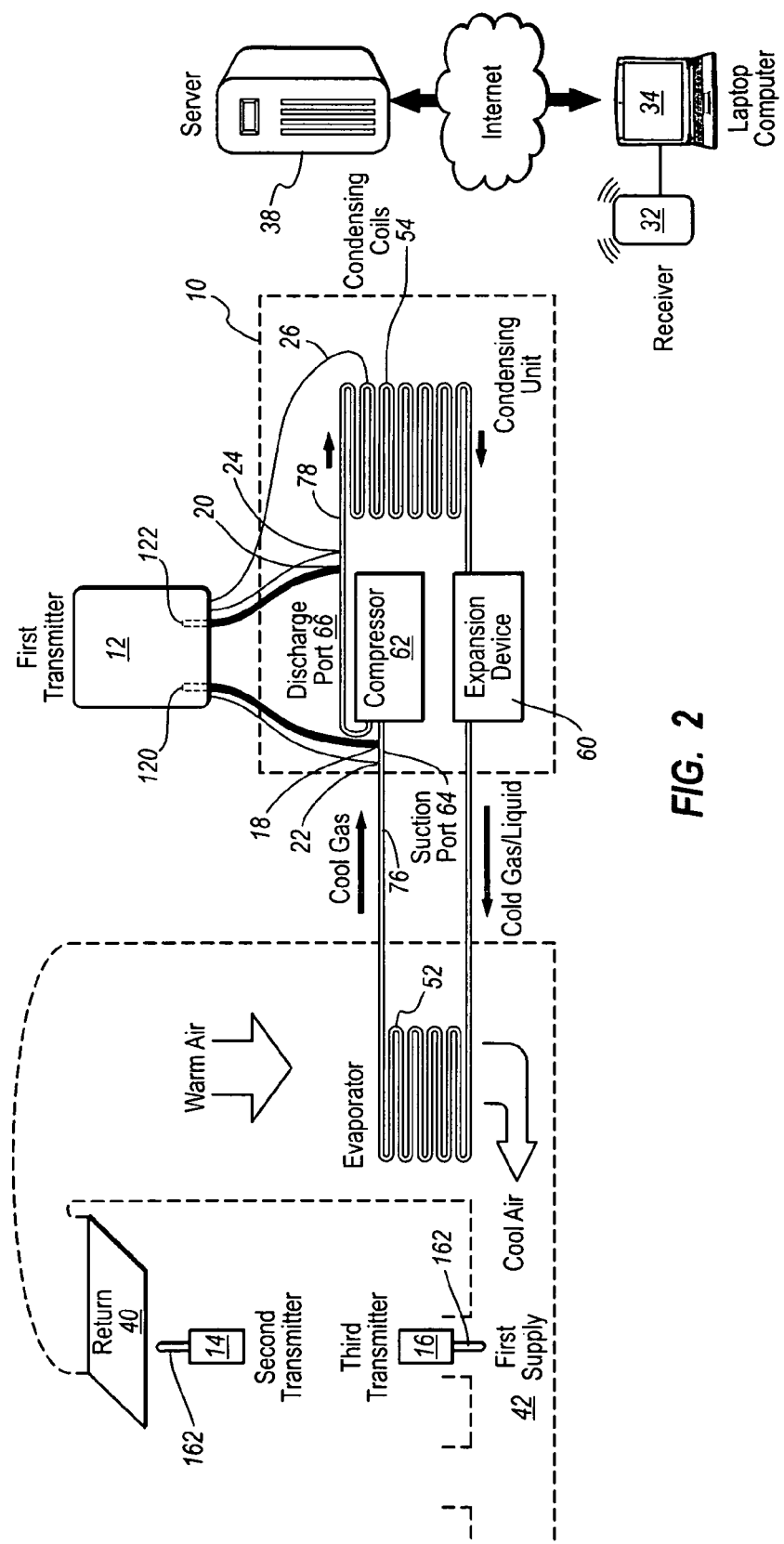
FIG. 2 depicts a schematic representation of components of the air conditioning system and the data-gathering system of FIG. 1 in greater detail.

Referring now to FIG. 2, the air conditioning system and the data-gathering system of FIG. 1 are shown in greater detail. An air conditioning system uses the evaporation cycle of a fluid refrigerant, such as Freon, to lower the temperature and the humidity of the air inside a building. The refrigerant flows through a closed system comprising condensing unit 10 and evaporator coils 52. Condensing unit 10 comprises a compressor 62 with a suction port 64 and a discharge port 66, condensing coils 54, and an expansion device 60. The refrigerant enters compressor 62 through suction port 64 as a cool gas. The compressor compresses the gas, transforming it into a hotter gas that flows out of the compressor through discharge port 66. As the hotter gas passes through condensing coils 54, heat is dissipated, causing the hotter gas to condense into a cooler liquid. The cooler liquid then passes through expansion device 60, which lowers the pressure on the refrigerant, transforming it into a colder gas or liquid. The colder gas or liquid then flows through evaporator 52. As warm air passes over evaporator 52, the refrigerant absorbs some of the warm air's heat, lowering the air's temperature and transforming the refrigerant into a cool gas that re-enters compressor 62 and begins the evaporation cycle anew.

As described above, the data-gathering system comprises three transmitters 12, 14, and 16, receiver 32, and mobile computing device 34 in communication with server 38 via the Internet. The mobile computing device 34 is adapted to analyze data and determine the status of the air conditioning system; communication with the server 38 is not necessary to receive the data, analyze the data, or determine the status of the air conditioning system. However, mobile computing device 34 and server 38 may periodically synchronize and exchange information.

First transmitter 12 is positioned adjacent to condensing unit 10. This device transmits data collected from two pressure sensors 120 and 122 and three temperature sensors 22, 24, and 26. The suction pressure sensor 120 is connected to the condensing unit's service valve (Schrader port) via the suction pressure sensor hose 18 such that suction pressure sensor 120 measures the suction pressure at the compressor. Discharge pressure sensor 122 is connected to the Schrader port via the discharge pressure sensor hose 22 such that discharge pressure sensor 122 measures the discharge pressure at the compressor. Suction temperature sensor 22 is connected to the Schrader port such that suction temperature sensor 22 measures the temperature of the refrigerant in suction pipe 76. Discharge temperature sensor 24 is connected to the Schrader port such that discharge temperature sensor 24 measures the temperature of the refrigerant in the discharge pipe. Finally, condenser temperature sensor 26 is placed on the condensing coils and measures the temperature of the air that passes across the condensing coils.

Second transmitter 14 is positioned adjacent to the return vent 40. Second transmitter 14 measures the temperature and humidity of the air in the return using a temperature sensor and a humidity sensor encased in a cylinder 162.

Third transmitter 16 is positioned adjacent to supply vent 42, which may be the nearest supply vent. Using a temperature sensor encased in a cylinder 162, third transmitter 16 measures the temperature of the air supplied to the living space by the air conditioning system. By measuring the air temperature at a supply vent closest to evaporator 52 rather than at some other supply vent farther from evaporator 52, the data-gathering system senses a temperature that is more representative of the temperature of the air just after it leaves evaporator 52.

Transmitters 12, 14, and 16 transmit their measurements to receiver 32. Receiver 32 sends the measurements to the mobile computing device 34 via a universal serial bus (USB) connection, serial connection, parallel connection, wireless connection, Bluetooth connection, and/or any other communication connection known in the art. Mobile computing device 34 records these measurements and analyzes the recorded measurements to determine the status of the air conditioning system, such as whether the refrigerant is undercharged, properly charged, or overcharged. The user then has the option of adjusting the refrigerant charge as prescribed by the data analysis.

Figure 3:
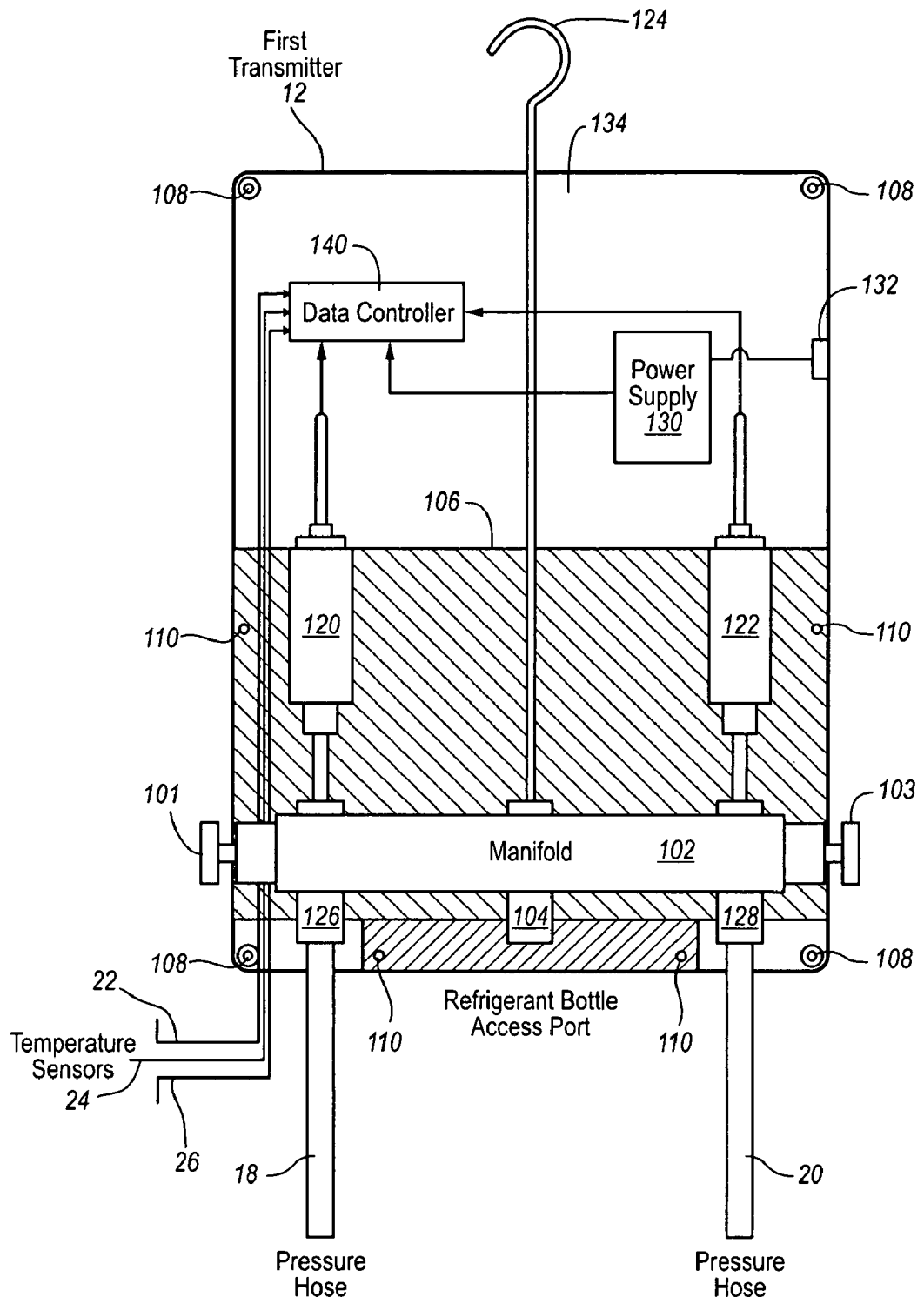
FIG. 3 depicts a schematic representation of the internal components of one embodiment of a transmitter to be positioned near the condensing unit, also referred to as a "condenser transmitter" or "first transmitter"

Reference will now be made to FIGS. 3-8, which illustrate the data-gathering system in more detail. FIG. 3 depicts the internal components of a first transmitter 12, which may be referred to herein as a "condenser transmitter". The components of first transmitter 12 are housed in an enclosure for protection. The enclosure of first transmitter 12 comprises a bottom portion 134 and a top portion. The top portion may be secured to bottom portion 134 using pegs 108. In FIG. 3, the top portion is not shown in order to show the internal components of first transmitter 12. A steel plate 106 is attached to bottom portion 134 by screws 110. For convenience, a hook 124 attached to a manifold 102 allows a user to hang first transmitter 12 from a convenient location, such as the grill of the condensing unit, while servicing the air conditioning system, such that first transmitter 12 is adjacent to the condensing unit.

Suction temperature sensor 22, discharge temperature sensor 24, and condenser temperature sensor 26 each attach to a data collector 140 and exit the enclosure near manifold 102. Each temperature sensor cable has strain relief means to permit the cable to move and bend without cracking or disconnecting from data collector 140. Near the tip of each temperature sensor is a clamp that can easily be attached to the condensing unit's pipes using one hand. Also, near the tip of each temperature sensor is a thermocouple. A thermocouple functions as a temperature sensor by converting heat into an electrical signal that is proportional to the sensed temperature. Data collector 140 periodically samples the electrical signals representing the sensed temperatures and transmits the sampled values to the receiver.

The suction pressure at the compressor is sensed via a suction pressure hose 18, a suction access port 126, and suction pressure sensor 120. Suction access port 126 is mounted on manifold 102, and suction pressure sensor 120 is mounted on steel plate 106. One end of suction pressure hose 18 is connected to the Schrader port of the condensing unit 10. The other end of suction pressure hose 18 is attached to suction access port 126. In this manner, the suction pressure is communicated to suction pressure sensor 120. Suction pressure sensor 120 may be a pressure transducer, which converts a sensed suction pressure to an electrical signal that is proportional to the magnitude of the sensed pressure. Data collector 140 periodically samples the electrical signal representing the sensed suction pressure and transmits the sampled value to receiver 32.

The discharge pressure at the compressor is sensed via a discharge pressure hose 20, a discharge access port 128, and discharge pressure sensor 122. Discharge access port 128 is mounted on manifold 102, and discharge pressure sensor 122 is mounted on steel plate 106. One end of discharge pressure hose 20 is connected to the Schrader port of the condensing unit 10. The other end of discharge pressure hose 20 is attached to discharge access port 128. In this manner the discharge pressure is communicated to discharge pressure sensor 122. Discharge pressure sensor 122 may be a pressure transducer. Data collector 140 periodically samples the electrical signal representing the sensed discharge pressure and transmits the sampled value to receiver 32.

Manifold 102 of first transmitter 12 may be used to add refrigerant to or remove refrigerant from the air conditioner. Discharging the air conditioner's refrigerant is achieved by attaching a bottle to a refrigerant access port 104 and opening the discharge valve (controlled by knob 103) while the suction valve (controlled by knob 101) is closed. Charging the air conditioner's refrigerant is achieved by attaching a bottle of refrigerant to refrigerant access port 104 and opening the suction valve while the discharge valve is closed.

The power source 130 of first transmitter 12 is an important consideration. Power source 130, which provides power to the data collector and the sensors, may comprise two AA batteries. Standard alkaline batteries or rechargeable nickel-cadmium batteries may be used. For convenience, if rechargeable nickel-cadmium batteries are used, they can be recharged via a battery recharge port 132 without removing them from the enclosure of first transmitter 12. Thus, power may be continually provided to the transmitters without removing the batteries.

In one embodiment, data collector 140 operates in a low-power mode between transmissions. In low-power mode, data collector 140 terminates all non-essential operations in order to conserve power. Therefore, because data collector 140 may operate in a low-power mode, freshly charged nickel-cadmium batteries should contain sufficient energy to power the transmitter for several weeks.

Figure 4:
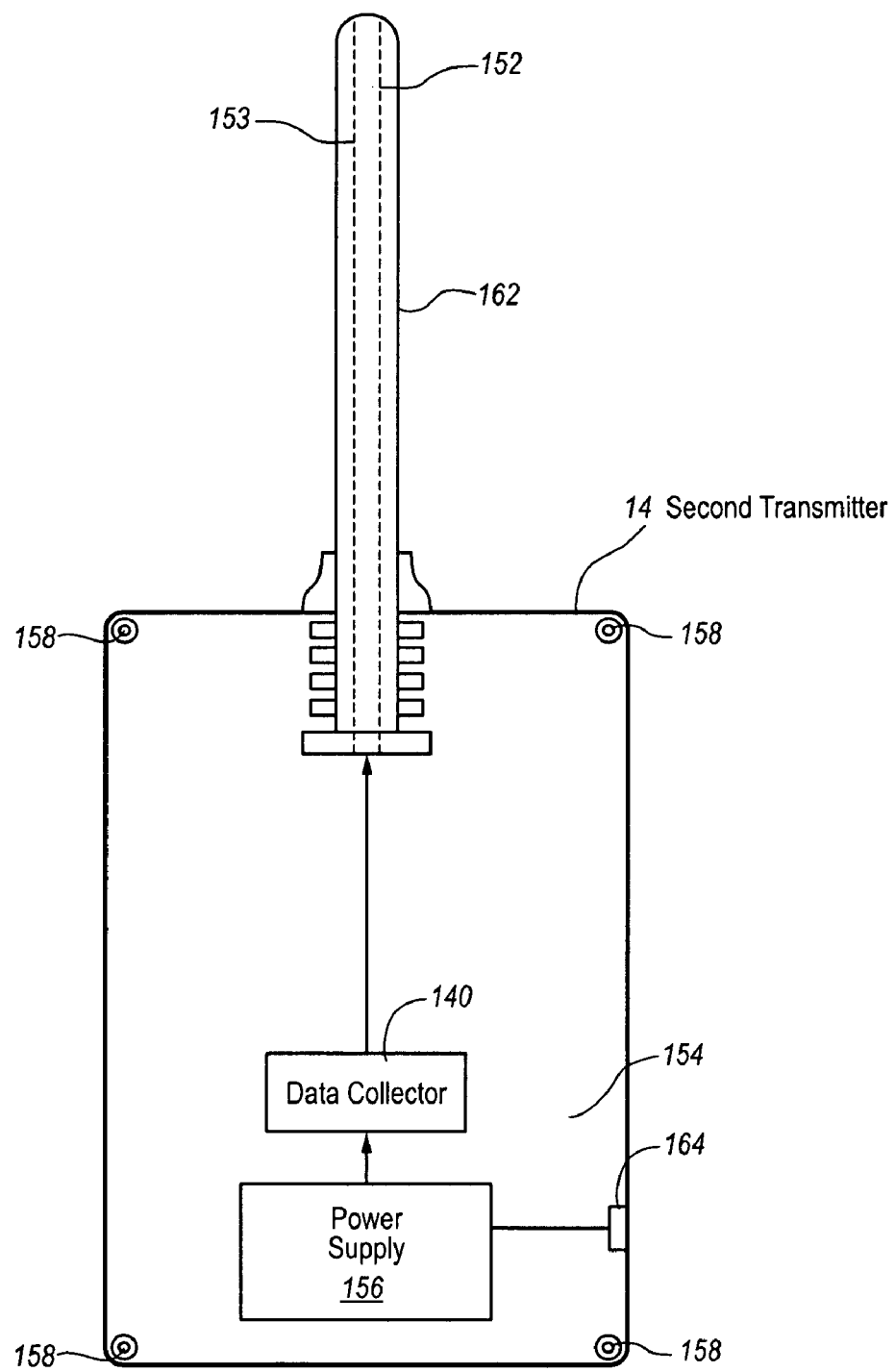
FIG. 4 depicts a schematic representation of the internal components of one embodiment of a transmitter to be positioned near a vent of the return, also referred to as a "return transmitter" or "second transmitter"
Figure 5:
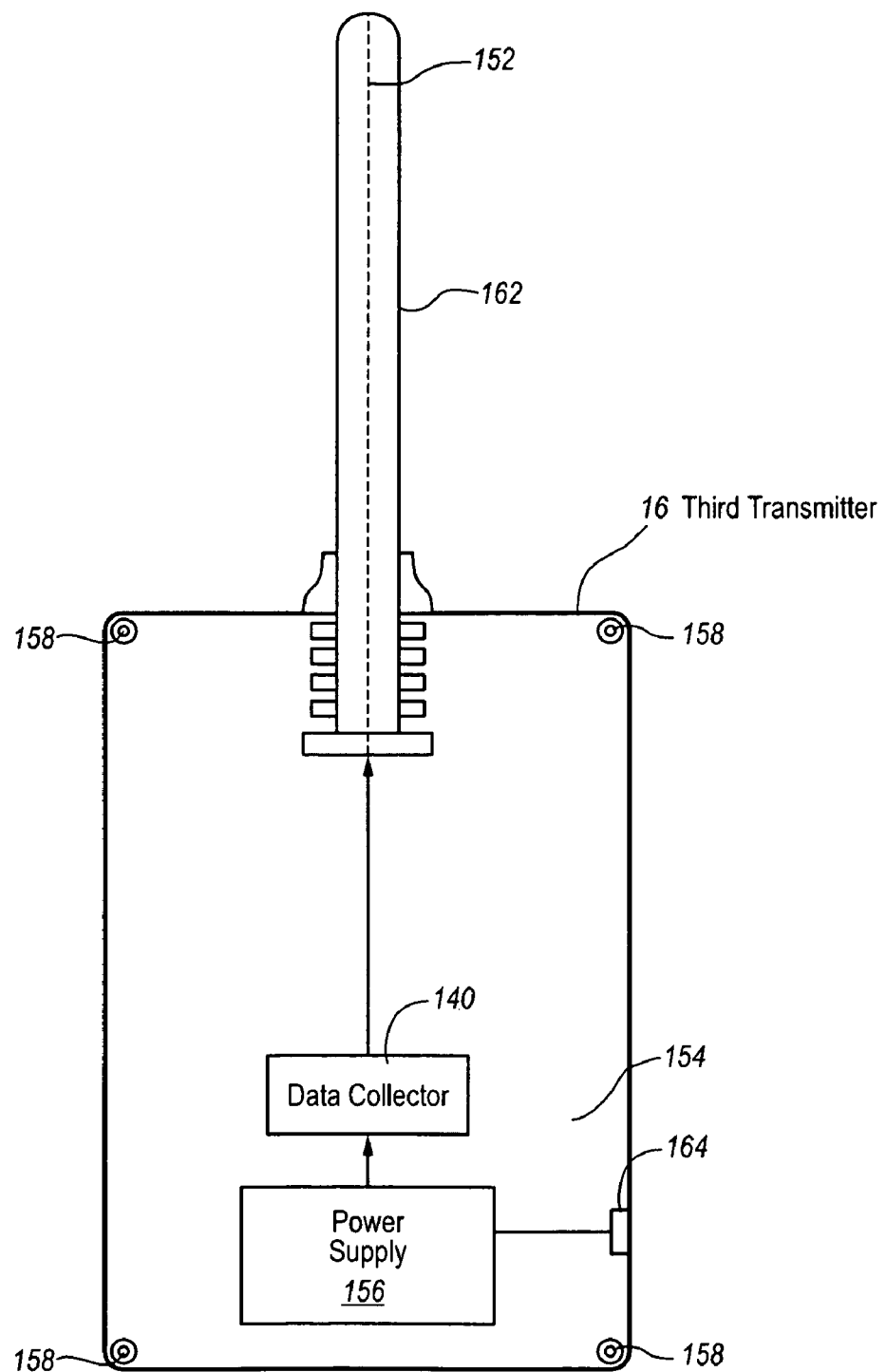
FIG. 5 depicts a schematic representation of the internal components of one embodiment of a transmitter to be positioned near a vent of the supply, also referred to as a "supply transmitter" or "third transmitter"

FIG. 4 depicts one embodiment of a second transmitter 14, also referred to as a "return transmitter", and FIG. 5 depicts one embodiment of a third transmitter 16, also referred to as a "supply transmitter". Both second transmitter 14 and third transmitter 16 may be transmitters that are used in the interior of a building and are therefore referred to collectively as "interior transmitters". Furthermore, in the embodiments of FIGS. 4 and 5, second and third transmitters are similar, with a difference being that second transmitter 14 has a humidity sensor 153. However, in another embodiment, each interior transmitter includes a humidity sensor. In yet another embodiment, neither interior transmitter includes a humidity sensor. Thus, in one embodiment, the data-gathering system includes the embodiment of an interior transmitter depicted in FIG. 4, referred to as second transmitter (or return transmitter) 14 and positioned adjacent to the return vent, as well as the embodiment of an interior transmitter depicted in FIG. 5, referred to as third transmitter (or supply transmitter) 16.

As in the case of first transmitter 12, the components of interior transmitters 14 and 16 are housed in respective enclosures for protection. The respective enclosures of interior transmitters 14 and 16 are comprised of respective bottom portions 154 and respective top portions. The respective top portions may be secured to respective bottom portions 154 using pegs 158. In FIGS. 4 and 5, the respective top portions are removed in order to show the internal components of interior transmitters 14 and 16.

In the embodiment of FIG. 4, second transmitter 14 includes a temperature sensor 152 and a humidity sensor 153. In the embodiment of FIG. 5, third transmitter 16 includes a temperature sensor 152. In each of transmitters 14 and 16, sensor(s) are encased in a stainless steel cylinder 162 that is mounted on the bottom of the enclosure. In one embodiment, the diameter of stainless steel cylinder 162 is about ¼ of an inch or less, which permits easy deployment of sensors into the air duct behind the grill of a return vent or a supply vent by sliding plastic cylinder 162 between adjacent slats of the grill. Thus, sensors may be easily placed into the air duct behind a vent in order to accurately sense parameters of the air in the duct. The volume just behind the nearest supply vent is a convenient location where accurate measurements of parameters of the air in the supply can be obtained. Likewise, the volume just behind the return vent is a convenient location where accurate measurements of parameters of the air in the return can be obtained.

In the embodiment of FIG. 5, third transmitter 16 includes a power source 156 that provides power to a data collector 140 and a temperature sensor 152. In the embodiment of FIG. 5, third transmitter 14 includes a power source 156 that provides power to a data collector 140, a temperature sensor 152, and a humidity sensor 153. Power source 156 may comprise two AA batteries. Standard alkaline batteries or rechargeable nickel-cadmium batteries may be used. For convenience, if rechargeable nickel-cadmium batteries are used, they can be recharged via a battery recharge port 164 without removing them from the enclosure.

Figure 6:
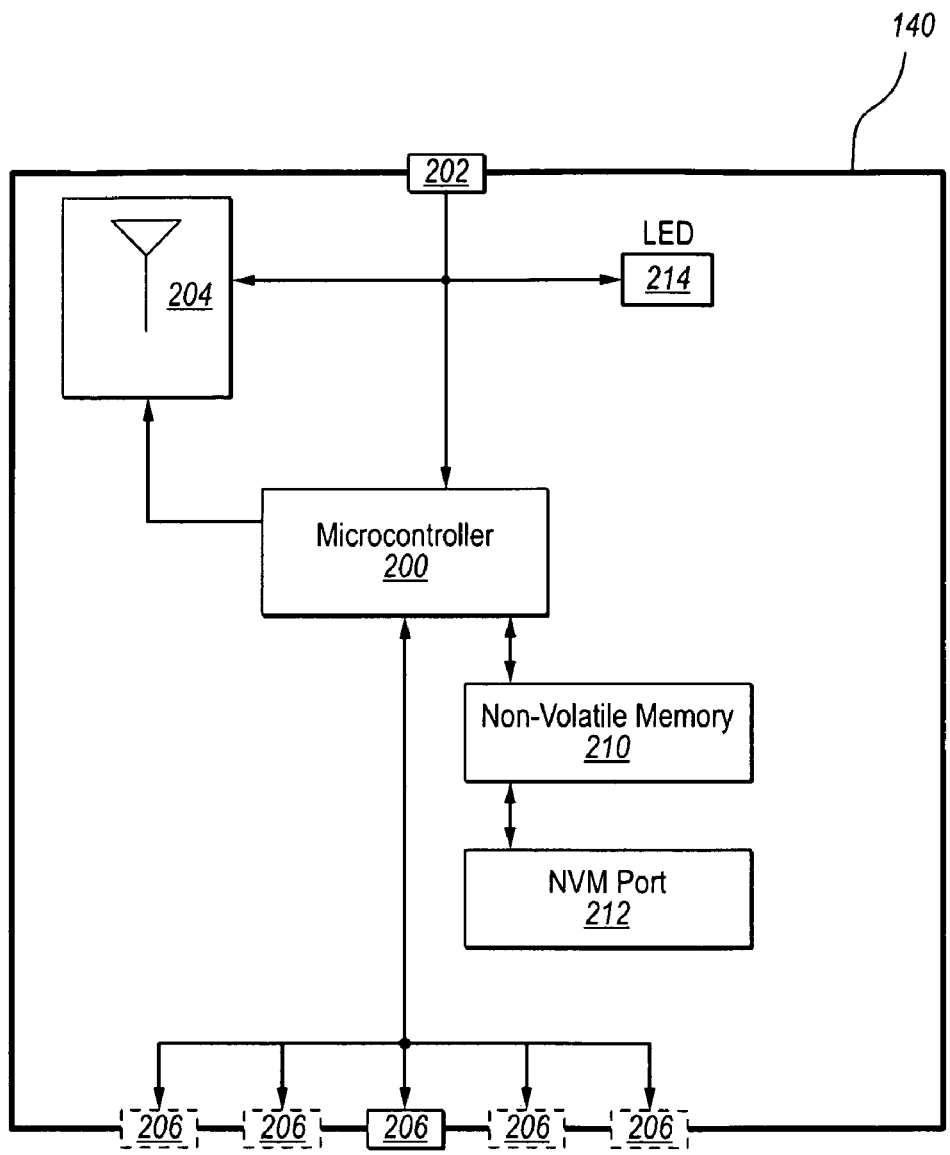
FIG. 6 depicts a schematic representation of one embodiment of a data collector.

Data collector 140 may have a similar embodiment for each of the first transmitter 12, second transmitter 14, and third transmitter 16, depending on the requirements for each transmitter. Referring to FIG. 6, an embodiment of data collector 140 is depicted. Data collector 140 comprises a microcontroller 200, a wireless output module 204, one or more sensor ports 206, a power supply port 202, and a light-emitting diode (LED) indicator 214. In one embodiment, five sensor ports 206 are provided for first transmitter 12, two sensor ports 206 are provided for second transmitter 14, and one sensor port 206 is provided for third transmitter 16. Data collector 140 periodically samples the values sensed by attached sensors and transmits data representing those sampled values to receiver 32.

A power supply connected to power supply port 202 provides power to microcontroller 200, wireless output module 204, and sensors attached to sensor port 206. Microcontroller 200 controls the sampling of the sensors and the transmission of the sensed values to a receiver via wireless output module 204. When the power supply is low, as may occur if the power supply comprises batteries, the data collector alerts the user via LED indicator 214 that the power supply should be replaced or recharged.

Data collector 140 may further comprise a non-volatile memory (NVM) 210 and an NVM port 212. The NVM 210 stores sensor calibration information and a unique transmitter identifier (TID). The sensor calibration information and TID are loaded into NVM 210 by a computing device, which accesses NVM 210 via NVM port 212. Storing the sensor calibration information locally reduces the likelihood that a sensor will be used with incorrect calibration data. The unique TID distinguishes a transmitter from other transmitters located nearby.

Wireless output module 204 contains an antenna. The use of an internal antenna provides increased durability relative to the use of an external antenna.

Microcontroller 200 is programmed to periodically sample the values sensed by the attached sensors and transmit the sampled values to the receiver. Microcontroller 200 does not necessarily average multiple readings of the same sensor to obtain an estimate of the sensed value for a given sampling period. As described above, the present invention is configured to obtain accurate measurements from the sensors, thereby minimizing the need for corrective sampling techniques.

Figure 7:
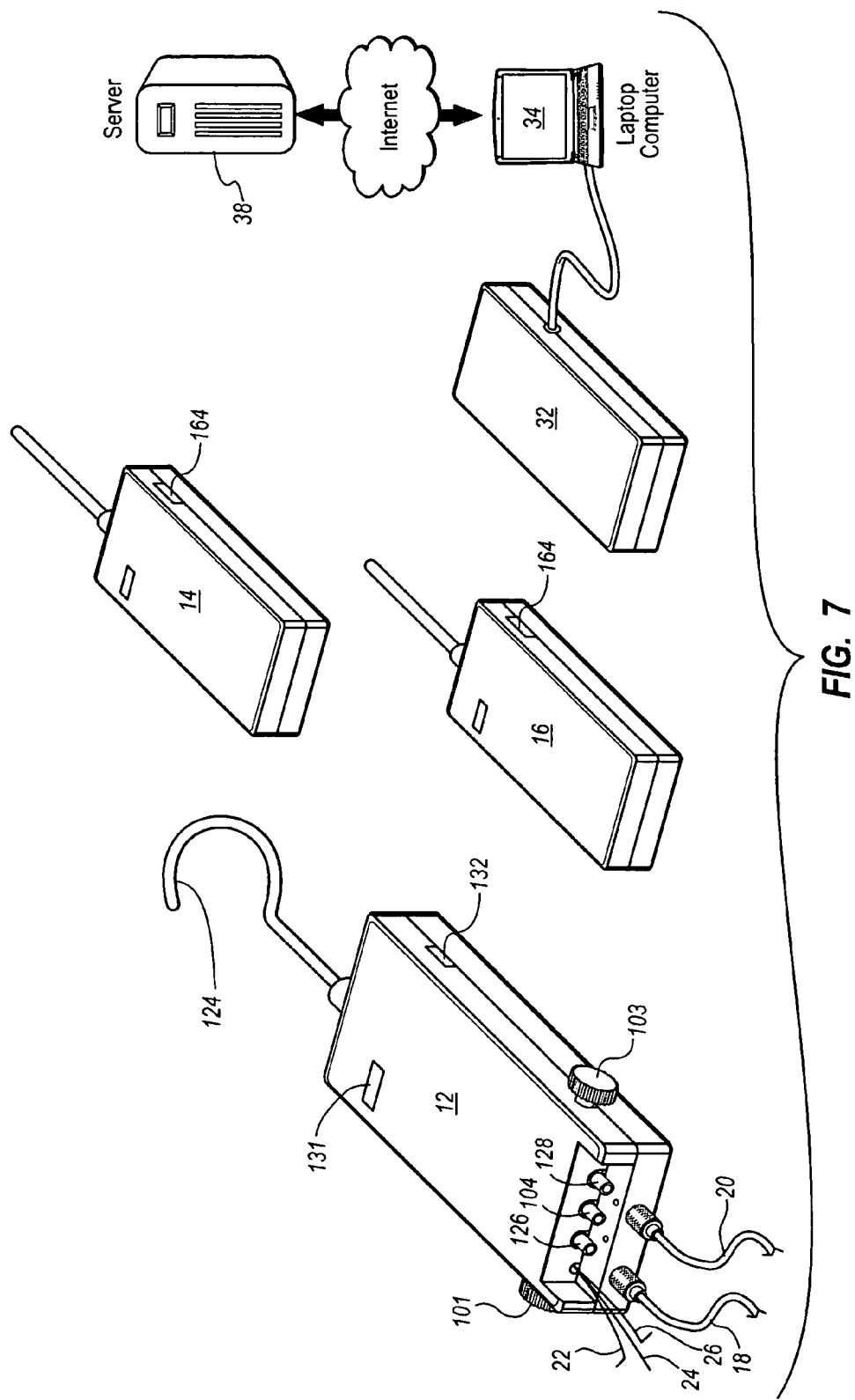
FIG. 7 depicts a representation of the components of one embodiment of a data-gathering system.

Referring to FIG. 7, which depicts the individual components of the data gathering system, receiver 32 is configurable to accept only data transmitted by specific transmitters. In particular, transmitters 12, 14, and 16 each have an associated unique transmitter identifier (TID) stored in their respective non-volatile memories. Software on receiver 32 is configurable to accept transmissions only from transmitters with specified TIDs. This feature permits multiple users to work in close proximity (e.g., on the roof of a school or at an apartment building with many individual air conditioning systems) without one air conditioning system's transmitters interfering with another air conditioning system's receiver.

Receiver 32 connects to mobile computing device 34 via a universal serial bus (USB) connection, serial connection, parallel connection, wireless connection, Bluetooth connection, and/or any other communication connection known in the art. If receiver 32 connects to mobile computing device 34 via a USB connection, then receiver 32 does not require its own power source, as power is provided to the receiver by computing device 34 via the USB connection.

Transmitters 12, 14, and 16 communicate with receiver 32 wirelessly. Wireless output modules 204 provides reliable data transmission with a range of up to 100 feet. Transmissions use an unlicensed portion of the spectrum. The communication protocol automatically switches frequencies within the unlicensed band to avoid interference from other devices. This collision detection and avoidance capability allows many devices to reliably share the same frequency band.

Mobile computing device 34 may be any device configurable to receive data from receiver 32 and to analyze that data to determine a status of the air conditioning system. In the one embodiment, mobile computing device 34 is a hand-held computer such as a laptop, notebook, or personal digital assistant (PDA).

Figure 8:
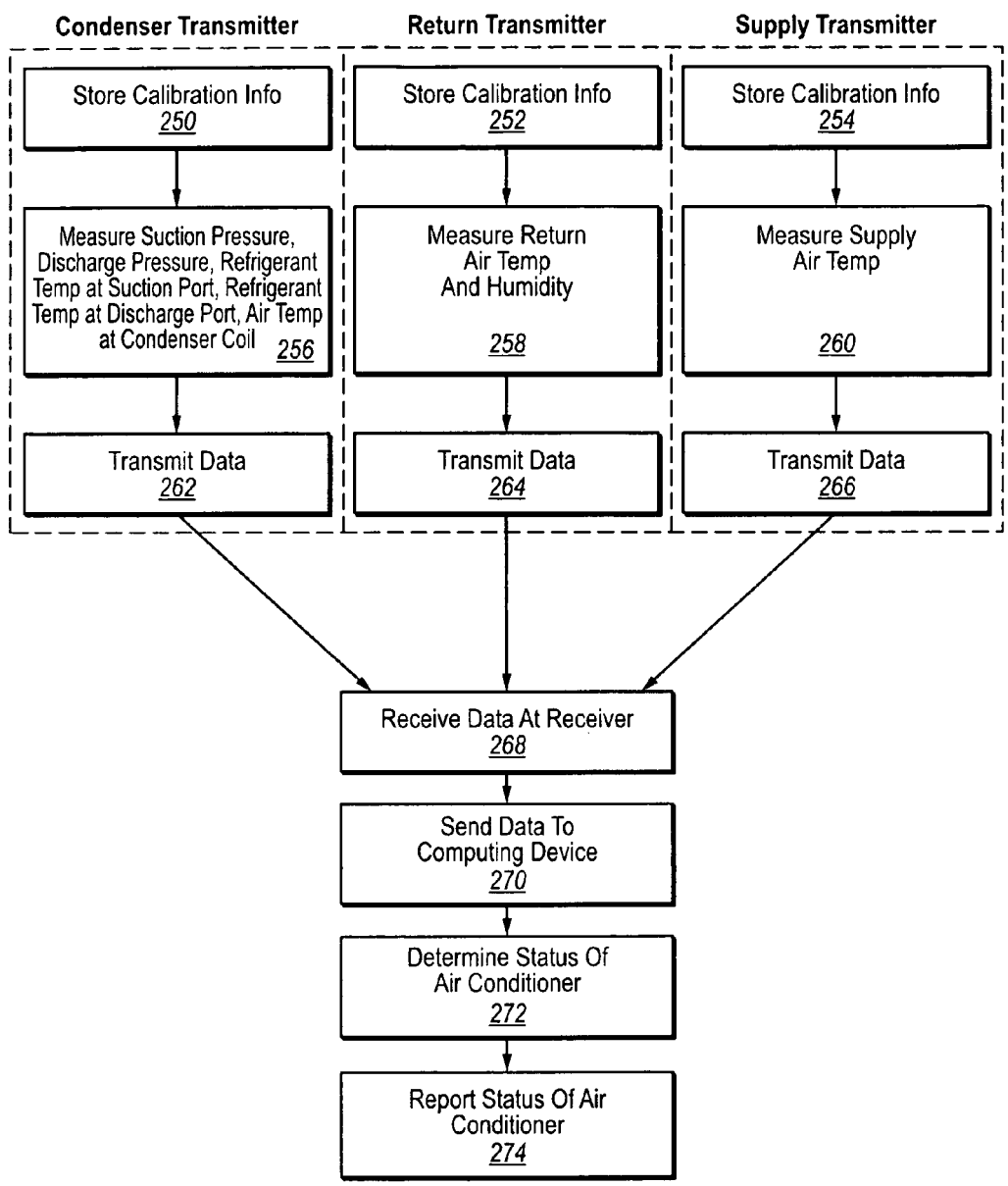
FIG. 8 is a flowchart that describes one exemplary method to diagnose the condition of an air conditioning system employing the system of FIGS. 1-7.

FIG. 8 is a flowchart that describes the method practiced by the invention to diagnose the condition of an air conditioning system. Elements 250, 256, and 262 correspond to first transmitter 12. Elements 252, 258, and 264 correspond to second transmitter or return transmitter 14. Elements 254, 260, and 266 correspond to third transmitter or supply transmitter 16.

In 250-254, appropriate calibration information is stored in a non-volatile memory attached to each transmitter. The sensors attached to first transmitter 12 obtain measurements 256 of the suction pressure at the compressor's suction port, the discharge pressure at the compressor's discharge port, the refrigerant temperature at the suction port, the refrigerant temperature at the discharge port, and the air temperature at the condensing coil. Likewise, the sensors attached to return transmitter 14 obtain measurements 258 of the temperature and humidity of the return air, and the sensor attached to supply transmitter 16 obtains a measurement 260 of the temperature of the supply air. Each transmitter then converts the measurement(s) obtained by its sensor(s) into data representing the measurement(s) and transmits the data 262-266 to receiver 32.

Receiver 32 receives the transmitted data 268 and sends the data to computing device 270. The mobile computing device then determines a status of the air conditioner 272 and reports that status 274. Such reporting may include, for example, displaying the status on a monitor attached to computing device 270, printing the status on paper, electronically mailing the status, reciting the status audibly, etc, In one embodiment, the status of the air conditioner is a status of the refrigerant, the status of the refrigerant being either undercharged, or properly charged, or over charged. Optionally, invention's user may add or remove refrigerant from the air conditioning system via the manifold of the first transmitter.

Although the present system has been described as employing three transmitters and eight sensors, one of skill in the art will recognize that any number of transmitters and/or sensors may be used in accordance with the teachings of this disclosure. Thus, the compositions of the system and transmitters are not limited by any of the described embodiments. Rather, one of skill in the art will appreciate the full scope of the present invention by reference to the appended claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for diagnosing a condition of an air conditioning system using a diagnostic system, the air conditioning system including refrigerant, a condensing unit, an evaporator, a return, a return vent, a supply, and a first supply vent, the condensing unit including a condensing coil, and a compressor, the compressor including a suction port and a discharge port, the evaporator being nearer to the first supply vent than to any other supply vent, the method comprising:
   positioning a first transmitter adjacent to the condensing unit and connected to the condensing unit by at least one port;
   sensing at least one parameter of the condensing unit using the first transmitter, the first transmitter wirelessly transmitting data representative of the at least one parameter of the condensing unit directly to a receiver;
   positioning a second transmitter adjacent to the return vent;
   sensing at least one parameter of the return using the second transmitter, the second transmitter wirelessly transmitting data representative of the at least one parameter of the return directly to the receiver;
   positioning a third transmitter adjacent to the first supply vent with a sensing portion of a sensor inserted through the supply vent into the supply so as to accurately sense parameters of the air in the supply;
   sensing at least one parameter of the supply using the third transmitter, the third transmitter wirelessly transmitting data representative of the at least one parameter of the supply directly to the receiver;
   sending the data received at the receiver to a computing device; and
   analyzing the data with the computing device in order to determine a status of the air conditioning system,
   wherein the at least one parameter of the return comprises a return air temperature, and the at least one parameter of the supply comprises a supply air temperature.

2. The method according to claim 1, wherein a first pressure sensor attached to the first transmitter senses a suction pressure at the suction port, a second pressure sensor attached to the first transmitter senses a discharge pressure at the discharge port, a first temperature sensor attached to the first transmitter senses a refrigerant temperature at the suction port, a second temperature sensor attached to the first transmitter senses a refrigerant temperature at the discharge port, and a third temperature sensor attached to the first transmitter senses an air temperature at the condensing coil.

3. The method according to claim 1, wherein a first temperature sensor attached to the second transmitter senses the return air temperature and a first humidity sensor attached to the second transmitter senses a return air humidity.

4. The method according to claim 1, wherein a first temperature sensor attached to the third transmitter senses the supply air temperature.

5. A method as recited in claim 1, further comprising determining and reporting a status of refrigerant in the air conditioning system and adding refrigerant to the air conditioning system, if the status of refrigerant in the air conditioning system is an undercharged status, or removing refrigerant from the air conditioning system, if the status of refrigerant in the air conditioning system is an overcharged status, through a manifold on the first transmitter while the first transmitter is connected to at least one port.

6. A method as recited in claim 1, wherein the sensing portion of the at least one sensor that is inserted through the supply vent comprises an elongate cylindrical member extending from a housing of the transmitter and having humidity and temperature sensors therein.

7. A method as recited in claim 1, wherein each transmitter uses a unique transmitter identifier.

8. A method as recited in claim 1, wherein each transmitter uses a wireless output module, wherein the wireless output module is configured to transmit data on a plurality of frequencies and to switch frequencies within an unlicensed band to avoid interference from other devices.

9. A method for monitoring and servicing an air conditioning system using a wireless diagnostic system, the air conditioning system including refrigerant, a condensing unit, an evaporator, a return, a return vent, a supply, and a first supply vent, the condensing unit including a condensing coil, and a compressor, the compressor including a suction port and a discharge port, the evaporator being nearer to the first supply vent than to any other supply vent, the method comprising:
   positioning a first transmitter adjacent to the condensing unit and connected to the condenser by at least one port;
   at the first transmitter, sensing a suction pressure at the suction port, sensing a discharge pressure at the discharge port, sensing a refrigerant temperature at the suction port, sensing a refrigerant temperature at the discharge port, sensing an air temperature at the condensing coil, and wirelessly transmitting data representative of the sensed suction pressure, discharge pressure, refrigerant temperature at the suction port, refrigerant temperature at the discharge port, and air temperature at the condensing coil directly to a receiver using a unique transmitter identifier;
   positioning a second transmitter adjacent to the return vent;
   at the second transmitter, sensing a return air temperature and a return air humidity at the return, and wirelessly transmitting data representative of the return air temperature directly to the receiver using a unique transmitter identifier;
   positioning a third transmitter adjacent to the supply vent with a sensor portion of the transmitter inserted through the supply vent into the supply, such that an elongate sensing portion of the transmitter extends through adjacent slats of the grill of the supply vent into the supply, so as to accurately sense parameters of the air in the supply;
   at the third transmitter, sensing a supply air temperature at the supply, and wirelessly transmitting data representative of the supply air temperature directly to the receiver using a unique transmitter identifier;
   sending data received at the receiver to a computing device;
   analyzing the data with the computing device in order to determine information regarding the status of refrigerant in the air conditioning system;
   determining and reporting a status of refrigerant in the air conditioning system;
   and adding refrigerant to the air conditioning system, if the status of refrigerant in the air conditioning system is an undercharged status, or removing refrigerant from the air conditioning system, if the status of refrigerant in the air conditioning system is an overcharged status, through a manifold on the first transmitter while the first transmitter is connected to at least one port,
   wherein the suction pressure is sensed by a first pressure sensor attached to the first transmitter, the discharge pressure is sensed by a second pressure sensor attached to the first transmitter, the refrigerant temperature at the suction port is sensed by a first temperature sensor attached to the first transmitter, the refrigerant temperature at the discharge port is sensed by a second temperature sensor attached to the first transmitter, the air temperature at the condensing coil is sensed by a third temperature sensor attached to the first transmitter, the return air temperature is sensed by a first temperature sensor attached to the second transmitter, the return air humidity is sensed by a first humidity sensor attached to the second transmitter, and the supply air temperature is sensed by a first temperature sensor attached to the third transmitter and wherein each of the transmitters comprises a wireless output module configured to transmit data on a plurality of frequencies and to select one of the plurality of frequencies to avoid interference from other devices.

10. The method according to claim 9, wherein the first transmitter stores first calibration information in an attached non-volatile memory, the second transmitter stores second calibration information in an attached non-volatile memory, and the third transmitter stores third calibration information in an attached non-volatile memory.

11. A method as recited in claim 9, further comprising wirelessly sending data using a first transmitter identifier to at least one receiver on a dedicated network, wherein the first transmitter is configured to be placed adjacent to the condensing unit and connected to the condenser by at least one port;
wherein the second transmitter is configured to wirelessly send data using a second transmitter identifier to the at least one receiver on a dedicated network, wherein the second transmitter is configured to be placed adjacent to the return vent;
wherein the third transmitter is configured to wirelessly send data using a third transmitter identifier to the at least one receiver on a dedicated network, wherein the third transmitter is configured to be placed adjacent to the supply vent with the at least one temperature sensor inserted through the supply vent into the supply;
wherein the at least one receiver is adapted to wirelessly receive information from the first transmitter, the second transmitter, and the third transmitter on a dedicated network;
wherein a computing device is configured to receive information from the at least one receiver and adapted to analyze information received from the at least one receiver in order to determine a status of the air conditioning system, and
wherein the second transmitter senses at least one temperature parameter of the return, and the third transmitter senses at least one temperature parameter of the supply.

12. A method as recited in claim 9, further comprising storing calibration information locally on the first transmitter, second transmitter, and third transmitter so as to reduce the likelihood that a transmitter will be used with incorrect calibration data.

13. A method as recited in claim 9, wherein refrigerant is added or removed from the air conditioning system while the first transmitter is configured to sense parameters of the air conditioning system.

14. A portable system for diagnosing the condition of an air conditioning system, the air conditioning system including a condensing unit, a return, and a supply, the system comprising:
a first transmitter comprising at least one pressure sensor, at least one temperature sensor, and an output module configured to wirelessly send data using a first unique transmitter identifier to at least one receiver, wherein the first transmitter is configured to be placed adjacent to the condensing unit and connected to the condenser by at least one port;
a second transmitter comprising at least one temperature sensor and an output module configured to wirelessly send data using a second unique transmitter identifier to the at least one receiver, wherein the second transmitter is configured to be placed adjacent to the return vent;
a third transmitter comprising at least one temperature sensor and an output configured to wirelessly send data using a third unique transmitter identifier to the at least one receiver, wherein the third transmitter is configured to be placed adjacent to the supply vent with the at least one temperature sensor inserted through the supply vent into the supply;
the at least one receiver adapted to wirelessly receive information from the first transmitter, the second transmitter, and the third transmitter; and
a computing device configured to receive information from the at least one receiver and adapted to analyze information received from the at least one receiver in order to determine a status of the air conditioning system,
wherein the second transmitter senses at least one temperature parameter of the return, and the third transmitter senses at least one temperature parameter of the supply.

15. The system of claim 14, the second transmitter further comprising at least one humidity sensor.

16. The system of claim 15, wherein the second transmitter further comprises a data collector configured to receive measurements of at least one temperature sensed by the at least one temperature sensor, receive measurements of at least one humidity sensed by the at least one humidity sensor, and convert the measurements of the at least one temperature and the at least one humidity to data representing the measurements, and transmit the data to the receiver via the output module.

17. The system of claim 16, wherein the second transmitter further comprises a power source, the power source configured to provide power to the data collector, the at least one temperature sensor, the at least one humidity sensor, and the output module, the power source comprising two AA batteries.

18. The system of claim 14, the computing device comprising a display device for displaying the status of the air conditioning system.

19. The system of claim 14, wherein the first transmitter senses at least one pressure parameter of the condensing unit and at least one temperature parameter of the condensing unit and transmits first data representing the at least one pressure parameter of the condensing unit and the at least one temperature parameter of the condensing unit to the receiver, the second transmitter further senses at least one humidity parameter of the return and transmits second data representing the at least one temperature parameter of the return and the at least one humidity parameter of the return to the receiver, the third transmitter transmits third data representing the at least one temperature parameter of the supply to the receiver, the receiver receives the first, second, and third data, and sends the first, second, and third data to the computing device, and the computing device analyzes the first, second, and third data to determine a status of the air conditioning system.

20. The system of claim 14, wherein the condensing unit comprises a condensing coil and a compressor, the compressor comprising a suction port and a discharge port, and the at least one pressure sensor of the first transmitter comprises a first pressure sensor for sensing a suction pressure at the suction port and a second pressure sensor for sensing a discharge pressure at the discharge port, and the at least one temperature sensor of the first transmitter comprises a first temperature sensor for sensing a refrigerant temperature at the suction port, a second temperature sensor for sensing a refrigerant temperature at the discharge port, and a third temperature sensor for sensing an air temperature at the condensing coil.

21. The system of claim 14, the first transmitter further comprising a data collector configured to receive measurements of at least one pressure sensed by the at least one pressure sensor and measurements of at least one temperature sensed by the at least one temperature sensor, convert the measurements of the at least one pressure and the measurements of the at least one temperature to data representing the measurements, and transmit the data via the output module.

22. The system of claim 21, wherein the first transmitter further comprises a power source, the power source configured to provide power to the data collector, the at least one temperature sensor, the at least one pressure sensor, and the output module, the power source comprising two AA batteries.

23. The system of claim 14, wherein the third transmitter further comprises a data collector configured to receive measurements of at least one temperature sensed by the at least one temperature sensor, convert the measurements of the at least one temperature to data representing the measurements, and transmit the data via the output.

24. The system of claim 23, wherein the third transmitter further comprises a power source, the power source configured to provide power to the data collector, the at least one temperature sensor, and the output module, the power source comprising two AA batteries.

25. The system of claim 14, wherein the at least one receiver wirelessly receives data from at least one of the first transmitter, the second transmitter, and the third transmitter on a dedicated network.

26. A portable system for diagnosing the condition of an air conditioning system, the air conditioning system including refrigerant, a condensing unit, an evaporator, a return, a return vent, a supply, and first supply vent, the condensing unit including a condensing coil, and a compressor, the compressor including a suction port and a discharge port, the evaporator being nearer to the first supply vent than to any other supply vent, the system comprising:
a first transmitter comprising a first pressure sensor for sensing a suction pressure at the suction port, a second pressure sensor for sensing a discharge pressure at the discharge port, a first temperature sensor for sensing a refrigerant temperature at the suction port, a second temperature sensor for sensing a refrigerant temperature at the discharge port, a third temperature sensor for sensing an air temperature at the condensing coil, and an output module configured to wirelessly send data and a first transmitter identifier directly to at least one receiver on a dedicated network, wherein the first transmitter is configured to be placed adjacent to the condensing unit and connected to the condensing unit by at least one port;
a second transmitter comprising a temperature sensor for sensing the return air temperature at the return, a humidity sensor for sensing the return air humidity at the return, and an output module configured to wirelessly send data and a second transmitter identifier directly to the at least one receiver, wherein the second transmitter is configured to be placed adjacent to the return vent;
a third transmitter comprising a temperature sensor for sensing the supply air temperature at the supply and an output module configured to wirelessly send data and a third transmitter identifier directly to the at least one receiver, wherein the third transmitter is configured to be placed adjacent to the first supply vent with the temperature sensor inserted through the supply vent into the supply;
the at least one receiver adapted to receive information from the first transmitter, the second transmitter, and the third transmitter; and
a computing device configured to receive information from the at least one receiver and adapted to analyze information received from the at least one receiver in order to determine a status of the air conditioning system, wherein the first transmitter senses the suction pressure, the discharge pressure, the refrigerant temperature at the suction port, the refrigerant temperature at the discharge port, and the air temperature at the condensing coil and transmits first data representing the suction pressure, the discharge pressure, the refrigerant temperature at the suction port, the refrigerant temperature at the discharge port, and the air temperature at the condensing coil to the receiver, the second transmitter senses the return air temperature and the return air humidity and transmits second data representing the return air temperature and the return air humidity to the receiver, the third transmitter senses the supply air temperature and transmits third data representing the supply air temperature to the receiver, the receiver receives the first, second, and third data, and sends the first, second, and third data to the computing device, and the computing device analyzes the first, second, and third data to determine a status of the air conditioning system.

27. A portable system for servicing an air conditioning system, the air conditioning system including refrigerant, a condensing unit, an evaporator, a return, a return vent, a supply, and a first supply vent, the condensing unit including a condensing coil, and a compressor, the compressor including a suction port and a discharge port, the evaporator being nearer to the first supply vent than to any other supply vent, the system comprising:
a first transmitter comprising:
a first pressure sensor for sensing a suction pressure at the suction port, a second pressure sensor for sensing a discharge pressure at the discharge port, a first temperature sensor for sensing a refrigerant temperature at the suction port, a second temperature sensor for sensing a refrigerant temperature at the discharge port, a third temperature sensor for sensing an air temperature at the condensing coil,
a wireless output module configured to transmit first data and a first transmitter identifier on a plurality of frequencies, wherein the wireless output module selects one of the plurality of frequencies based on the absence of other data traffic on the frequency;
a data collector for receiving measurements of the sensed pressures and temperatures, converting the measurements to first data representing the measurements, and transmitting the first data via the wireless output module directly to at least one receiver on a dedicated network, the data collector having a non-volatile memory for storing the first transmitter identifier and calibration information and a microcontroller for controlling the operation of the sensors and the wireless output module, a rechargeable power source configured to provide power to the data collector, the first and second pressure sensors, the first, second, and third temperature sensors, and the wireless output module, and a manifold, a suction access port attached to the manifold, and a discharge access port attached to the manifold, wherein the first transmitter is configured to be placed adjacent to the condensing unit and connected to the condensing unit by at least one port;

a second transmitter comprising:
- a first temperature sensor for sensing a return air temperature at the return and a first humidity sensor for sensing a return air humidity at the return;
- a wireless output module configured to transmit second data and a second transmitter identifier on a plurality of frequencies, wherein the wireless output module selects one of the plurality of frequencies based on the absence of other data traffic on the frequency;
- a data collector for receiving measurements of the sensed return air temperature and the sensed return air humidity, converting the measurements to second data representing the measurements, and transmitting the second data via the wireless output module directly to the at least one receiver on a dedicated network, the data collector having a non-volatile memory for storing the second transmitter identifier and calibration information and a microcontroller for controlling the operation of the sensors and the wireless output module; and
- a rechargeable power source configured to provide power to the data collector, the first temperature sensor, the first humidity sensor, and the wireless output module, wherein the second transmitter is configured to be placed adjacent to the return vent;

a third transmitter comprising:
- a first temperature sensor for sensing a supply air temperature at the supply;
- a wireless output module configured to transmit third data and a third transmitter identifier on a plurality of frequencies, wherein the wireless output module selects one of the plurality of frequencies based on the absence of other data traffic on the frequency;
- a data collector for receiving measurements of the sensed supply air temperature, converting the measurements to third data representing the measurements, and transmitting the third data via the wireless output module directly to the at least one receiver on a dedicated network, the data collector having a non-volatile memory for storing the third transmitter identifier and calibration information and a microcontroller for controlling the operation of the sensors and the wireless output module; and
- a rechargeable power source configured to provide power to the data collector, the first temperature sensor, and the wireless output module, wherein the third transmitter is configured to be placed adjacent to the first supply vent with an elongate sensing portion of the temperature sensor inserted through the supply vent into the supply;

the at least one receiver configured to directly, wirelessly receive the first data from the first transmitter, directly, wirelessly receive the second data from the second transmitter, and directly, wirelessly receive the third data from the third transmitter; and a computing device configured to receive information from the at least one receiver, the computing device being adapted to analyze the information received from the at least one receiver and to determine a status of refrigerant in the air conditioning system, wherein the first transmitter transmits the first data to the receiver, the second transmitter transmits the second data to the receiver, the third transmitter transmits the third data to the receiver, the at least one receiver receives the first, second, and third data, and the at least one receiver sends the first, second, and third data to the computing device, such that the computing device analyzes the first data, the second data, and the third data and reports a status of refrigerant in the air conditioning system.

28. A system as recited in claim 27, wherein each of the first, second, and third transmitters comprises a housing and wherein each of the respective wireless output modules of the respective first, second, and third transmitters is positioned within the respective housing of the transmitters.

* * * * *

UNITED STATES PATENT AND TRADEMARK OFFICE
CERTIFICATE OF CORRECTION

PATENT NO. : 8,322,151 B1
APPLICATION NO. : 12/205310
DATED : December 4, 2012
INVENTOR(S) : Garofalo Page 1 of 1

It is certified that error appears in the above-identified patent and that said Letters Patent is hereby corrected as shown below:

In the Specification

Column 6
Line 26, change "22" to --20--

Column 8
Line 51, change "plastic" to --stainless steel--
Line 62, change "FIG. 5" to --FIG. 4--
Line 63, change "third" to --second--

Column 10
Line 4, change "modules" to --module--
Line 13, change "In the one" to --In one--
Line 46, change "etc," to --etc.--

Signed and Sealed this
Tenth Day of February, 2015

Michelle K. Lee
*Deputy Director of the United States Patent and Trademark Office*